US012638107B2

(12) United States Patent
Wakabayashi et al.

(10) Patent No.: US 12,638,107 B2
(45) Date of Patent: May 26, 2026

(54) HOSE FOR TRANSPORTATION OF REFRIGERANT

(71) Applicant: The Yokohama Rubber Co., LTD., Tokyo (JP)

(72) Inventors: Kenta Wakabayashi, Kanagawa (JP); Shusaku Tomoi, Kanagawa (JP); Shun Sato, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 383 days.

(21) Appl. No.: 17/759,494

(22) PCT Filed: Dec. 17, 2020

(86) PCT No.: PCT/JP2020/047263
§ 371 (c)(1),
(2) Date: Jul. 26, 2022

(87) PCT Pub. No.: WO2021/153079
PCT Pub. Date: Aug. 5, 2021

(65) Prior Publication Data
US 2023/0055055 A1      Feb. 23, 2023

(30) Foreign Application Priority Data

Jan. 30, 2020    (JP) ................................. 2020-014203

(51) Int. Cl.
| | |
|---|---|
| *F16L 11/08* | (2006.01) |
| *C08L 77/06* | (2006.01) |
| *B32B 1/08* | (2006.01) |
| *B60H 1/00* | (2006.01) |
| *F16L 11/04* | (2006.01) |

(52) U.S. Cl.
CPC ............... *F16L 11/08* (2013.01); *C08L 77/06* (2013.01); *B32B 1/08* (2013.01); *B32B 2307/7244* (2013.01); *B32B 2307/7246* (2013.01); *B60H 1/00571* (2013.01); *F16L 2011/047* (2013.01)

(58) Field of Classification Search
CPC ... B32B 1/08; B32B 27/32; B32B 2262/0276; B32B 5/02; B32B 27/12; B32B 27/18; B32B 27/306; B32B 27/34; B32B 27/36; B32B 2250/40; F16L 11/08; Y10T 428/139; C08L 77/02; C08L 77/06; C08K 2003/2296; C08K 3/22; C08K 5/09
USPC ................. 428/36.9, 125, 126; 138/125, 126
See application file for complete search history.

(56) References Cited

U.S. PATENT DOCUMENTS

| | | | | |
|---|---|---|---|---|
| 3,866,632 | A | * | 2/1975 | Schaffer ................ B29C 48/153 |
| | | | | 138/132 |
| 5,244,961 | A | * | 9/1993 | Yu ............................ C08K 3/22 |
| | | | | 524/514 |
| 5,681,899 | A | * | 10/1997 | Wang .................... C08L 23/283 |
| | | | | 524/81 |
| 2004/0134554 | A1 | | 7/2004 | Okuyama |
| 2008/0017266 | A1 | | 1/2008 | Doshi et al. |
| 2014/0116562 | A1 | | 5/2014 | Haines et al. |
| 2019/0234538 | A1 | | 8/2019 | Sakamoto et al. |
| 2021/0107734 | A1 | | 4/2021 | Yano et al. |

FOREIGN PATENT DOCUMENTS

| | | | |
|---|---|---|---|
| CN | 1498763 | A | 5/2004 |
| CN | 103791178 | A | 5/2014 |
| CN | 106917921 | A | 7/2017 |
| CN | 110035960 | A | 7/2019 |
| DE | 11 2017 005 273 | B4 | 1/2023 |
| JP | H03-51594 | A | 3/1991 |
| JP | 6-294484 | A | 10/1994 |
| JP | 6-294485 | A | 10/1994 |
| JP | 2002-212342 | A | 7/2002 |
| JP | 2006-63280 | A | 3/2006 |
| JP | 2007-9171 | A | 1/2007 |
| JP | 2007-32725 | A | 2/2007 |
| JP | 4215372 | B2 * | 1/2009 |
| JP | 2010-184403 | A | 8/2010 |
| JP | 2012-189129 | A | 10/2012 |
| JP | 2013-228081 | A | 11/2013 |
| JP | 2014-95093 | A | 5/2014 |

OTHER PUBLICATIONS

Matweb.*

* cited by examiner

*Primary Examiner* — Aaron Austin
(74) *Attorney, Agent, or Firm* — Thorpe North & Western

(57)      ABSTRACT

A hose for transportation of refrigerant includes an inner layer, a reinforcing layer, and an outer layer. The inner and outer layers each include a thermoplastic resin composition having a sea-island structure including a matrix containing a thermoplastic resin and a domain containing an elastomer. A water vapor permeability coefficient of the thermoplastic resin composition of the outer layer at a temperature of 60° C. and a relative humidity of 100% is 10.0 g·mm/(m²·24 h) or less. An oxygen permeability coefficient of the thermoplastic resin composition of the inner layer at a temperature of 21° C. and a relative humidity of 50% is 0.05 cm³ mm/(m²·day·mmHg) or less. A water vapor permeation amount of the hose is 6.0 mg/(240 h·cm²) or less. A hydrofluoroolefin HFO-1234*yf* permeation amount of the hose is 170 g/(m²·72 h) or less, and the mass per 1 m² of the outer surface area of the hose is 3000 g/m² or less.

16 Claims, No Drawings

HOSE FOR TRANSPORTATION OF REFRIGERANT

TECHNICAL FIELD

The present technology relates to a hose for transportation of refrigerant. The present technology particularly relates to a hose for transportation of refrigerant for an air conditioner in an automobile.

BACKGROUND ART

With the increasing demand for weight reduction of automobiles, efforts have been made to achieve the weight reduction by manufacturing hoses, which have been made of rubber and used in automobiles, with a resin having high barrier properties in place of rubber to reduce thickness. In particular, the main material of the hose for transportation of refrigerant of the current automobile air conditioners is rubber, and if the main material can be substituted with a resin having high barrier properties, the weight reduction can be achieved.

For example, JP H03-51594 A describes a refrigerant hose including an inner tube, a reinforcing layer, and an outer tube, the inner tube including an inner layer made of a polyamide resin and an outer layer made of a thermoplastic elastomer that uses a polyamide resin as a continuous phase, and further describes an example in which an olefin-based thermoplastic elastomer is used in the outer tube.

In a hose for transportation of refrigerant used in an air conditioner for an automobile or the like, permeation of water vapor from outside of the hose causes freezing of moisture inside the air conditioner. Thus, a material with excellent low permeability of water vapor is required. However, the low water vapor permeability of an olefin-based thermoplastic elastomer is not sufficient.

SUMMARY

The present technology provides a hose for transportation of refrigerant that is lightweight and flexible and excels in low gas permeability and low water vapor permeability.

An embodiment of the present technology is a hose for transportation of refrigerant including an inner layer, a reinforcing layer, and an outer layer; wherein the outer layer includes a thermoplastic resin composition A having a sea-island structure including a matrix containing a thermoplastic resin and a domain containing an elastomer; the inner layer includes a thermoplastic resin composition B having a sea-island structure including a matrix containing a thermoplastic resin and a domain containing an elastomer; a water vapor permeability coefficient of the thermoplastic resin composition A at a temperature of 60° C. and a relative humidity of 100% is 10.0 g·mm/(m²·24 h) or less; an oxygen permeability coefficient of the thermoplastic resin composition B at a temperature of 21° C. and a relative humidity of 50% is 0.05 cm³ mm/(m²·day·mmHg) or less; a water vapor permeation amount of the hose for transportation of refrigerant is 6.0 mg/(240 h·cm²) or less; a hydrofluoroolefin HFO-1234yf permeation amount of the hose for transportation of refrigerant is 170 g/(m²·72 h) or less; and a mass per 1 m² of outer surface area of the hose for transportation of refrigerant is 3000 g/m² or less.

The present technology includes the following embodiments.

[1] A hose for transportation of refrigerant including an inner layer, a reinforcing layer, and an outer layer; wherein the outer layer includes a thermoplastic resin composition A having a sea-island structure including a matrix containing a thermoplastic resin and a domain containing an elastomer; the inner layer includes a thermoplastic resin composition B having a sea-island structure including a matrix containing a thermoplastic resin and a domain containing an elastomer; a water vapor permeability coefficient of the thermoplastic resin composition A at a temperature of 60° C. and a relative humidity of 100% is 10.0 g·mm/(m²·24 h) or less; an oxygen permeability coefficient of the thermoplastic resin composition B at a temperature of 21° C. and a relative humidity of 50% is 0.05 cm³ mm/(m²·day·mmHg) or less; a water vapor permeation amount of the hose for transportation of refrigerant is 6.0 mg/(240 h·cm²) or less; a hydrofluoroolefin HFO-1234yf permeation amount of the hose for transportation of refrigerant is 170 g/(m²·72 h) or less; and a mass per 1 m² of outer surface area of the hose for transportation of refrigerant is 3000 g/m² or less.

[2] The hose for transportation of refrigerant according to [1], wherein the thermoplastic resin composition A and the thermoplastic resin composition B have, at a temperature of 25° C., a 10% modulus of 10.0 MPa or less.

[3] The hose for transportation of refrigerant according to [1] or [2], wherein the thermoplastic resin composition A and the thermoplastic resin composition B each contain the domain at 50 vol % or more.

[4] The hose for transportation of refrigerant according to any one of [1] to [3], wherein the thermoplastic resin composition A and the thermoplastic resin composition B have, at a temperature of 25° C., an elongation at break of 100% or higher and a strength at break of 10 MPa or higher, and have, at a temperature of 150° C., an elongation at break of 100% or higher and a strength at break of 3 MPa or higher.

[5] The hose for transportation of refrigerant according to any one of [1] to [4], wherein the water vapor permeability coefficient of the thermoplastic resin composition A is smaller than the water vapor permeability coefficient of the thermoplastic resin composition B.

[6] The hose for transportation of refrigerant according to any one of [1] to [5], wherein the hose for transportation of refrigerant does not contain a rubber layer requiring a vulcanization step.

[7] The hose for transportation of refrigerant according to any one of [1] to [6], wherein the thermoplastic resin composition A and the thermoplastic resin composition B include a thermoplastic resin having a melting point of 150° C. or higher.

[8] The hose for transportation of refrigerant according to any one of [1] to [7], wherein the thermoplastic resin contained in the matrix of the thermoplastic resin composition A and the matrix of the thermoplastic resin composition B includes at least one type selected from the group consisting of a polyamide, a polyester, a polyvinyl alcohol, and a polyketone, and the elastomer contained in the domain of the thermoplastic resin composition A and the domain of the thermoplastic resin composition B includes at least one type selected from the group consisting of an olefin-based elastomer and a butyl-based elastomer.

[9] The hose for transportation of refrigerant according to any one of [1] to [8], wherein the thermoplastic resin composition A contains nylon 12 in the matrix and a modified butyl rubber in the domain, and the thermoplastic resin composition B contains nylon 6 in the matrix and a modified butyl rubber in the domain.

[10] The hose for transportation of refrigerant according to any one of [1] to [9], wherein the thermoplastic resin composition A and the thermoplastic resin composition B contain a phenylenediamine-based or a quinoline-based anti-aging agent or a trihydric alcohol having a triazine backbone, at least one processing aid, and at least one viscosity stabilizer, and 50 mass % or more of the viscosity stabilizer is contained in the matrix.

The hose for transportation of refrigerant of an embodiment of the present technology is flexible and lightweight, and exhibits excellent low gas permeability and low water vapor permeability.

DETAILED DESCRIPTION

The present technology relates to a hose for transportation of refrigerant. A hose for transportation of refrigerant refers to a hose for transporting a refrigerant for an air conditioner or the like. The hose for transportation of refrigerant of embodiments of the present technology is particularly suitably used as a hose for transporting a refrigerant of an air conditioner of an automobile. Examples of air conditioner refrigerants include hydrofluorocarbons (HFCs), hydrofluoroolefins (HFOs), hydrocarbons, carbon dioxide, and ammonia; examples of the HFCs include R410A, R32, R404A, R407C, R507A, and R134a; examples of the HFOs include R1234yf, R1234ze, 1233zd, R1123, R1224yd, and R1336mzz; and examples of the hydrocarbons include methane, ethane, propane, propylene, butane, isobutane, hexafluoropropane, and pentane.

The hose for transportation of refrigerant includes an inner layer, a reinforcing layer, and an outer layer.

The outer layer contains a thermoplastic resin composition A. The thermoplastic resin composition A has a sea-island structure including a matrix and a domain. The matrix contains a thermoplastic resin. The domain contains an elastomer.

The inner layer contains a thermoplastic resin composition B. The thermoplastic resin composition B has a sea-island structure including a matrix and a domain. The matrix contains a thermoplastic resin. The domain contains an elastomer.

The reinforcing layer is not limited, and may be, for example, a layer of braided fibers.

The water vapor permeability coefficient (hereinafter, also referred to as "$P_A(H_2O)$") of the thermoplastic resin composition A at a temperature of 60° C. and 100% relative humidity is 10.0 g·mm/(m²·24 h) or less, preferably 8.0 g·mm/(m²·24 h) or less, and more preferably 5.0 g·mm/(m²·24 h) or less. When the $P_A(H_2O)$ is too high, humidity in the outside air penetrates into the hose for transportation of refrigerant and can cause freezing of moisture inside the air conditioner. An embodiment of the present technology effectively blocks the intrusion of moisture from the outside by using, as the material constituting the outer layer, a material that is less likely to allow the permeation of water vapor.

The water vapor permeability coefficient is defined as follows.

The water vapor permeability coefficient is the amount of water vapor that permeates a thickness of 1 mm per 1 m² of surface area in 24 hours under stipulated temperature and humidity conditions.

The oxygen permeability coefficient (hereinafter, also referred to as "$P_B(O_2)$") of the thermoplastic resin composition B at a temperature of 21° C. and a relative humidity of 50% is 0.05 cm³ mm/(m²·day·mmHg) or less, preferably 0.03 cm³ mm/(m²·day·mmHg) or less, and more preferably 0.02 cm³ mm/(m²·day·mmHg) or less. When the $P_B(O_2)$ is too high, the refrigerant in the hose for transportation of refrigerant penetrates into the material constituting the hose, thereby facilitating leakage of the refrigerant to the outside. An embodiment of the present technology effectively blocks leakage of the refrigerant to the outside by using, as the material constituting the inner layer, a material having a small oxygen permeability coefficient.

The oxygen permeability coefficient is defined as follows.

The oxygen permeability coefficient is the amount of oxygen that permeates a thickness of 1 mm per 1 m² of surface area per 1 mmHg of pressure in one day under stipulated temperature and humidity conditions.

The oxygen permeability coefficient (hereinafter, also referred to as "$P_A(O_2)$") of the thermoplastic resin composition A at a temperature of 21° C. and a relative humidity of 50% is not limited, but is preferably 0.05 cm³ mm/(m²·day·mmHg) or less, more preferably 0.03 cm³ mm/(m²·day·mmHg) or less, and even more preferably 0.02 cm³ mm/(m²·day·mmHg) or less. When the $P_A(O_2)$ is set to within this range, the outer layer can contribute to preventing refrigerant leakage along with the inner layer.

The water vapor permeability coefficient (hereinafter, also referred to as "$P_B(H_2O)$") of the thermoplastic resin composition B at a temperature of 60° C. and 100% relative humidity is not limited, but is preferably 10.0 g·mm/(m²·24 h) or less, more preferably 8.0 g·mm/(m²·24 h) or less, and even more preferably 5.0 g·mm/(m²·24 h) or less. When the $P_B(H_2O)$ is set to within this range, the inner layer can also contribute to preventing moisture intrusion along with the outer layer.

The water vapor permeability coefficient of the thermoplastic resin composition A is preferably smaller than the water vapor permeability coefficient of the thermoplastic resin composition B. A decrease in physical properties of a gas barrier layer of the inner layer can be prevented by disposing a water vapor barrier layer at the outer layer.

The oxygen permeability coefficient of the thermoplastic resin composition B is preferably smaller than the oxygen permeability coefficient of the thermoplastic resin composition A. Using, in the inner layer, a material having a smaller oxygen permeability coefficient than that of the outer layer is an effective measure for preventing permeation of the refrigerant in the hose for transportation of refrigerant into the material constituting the hose and leakage of the refrigerant to the outside.

A 10% modulus (hereinafter, may also be referred to as "M10") at a temperature of 25° C. of the thermoplastic resin composition A and the thermoplastic resin composition B is preferably 10.0 MPa or less, more preferably 9.4 MPa or less, and even more preferably 6.0 MPa or less. A flexible hose for transportation of refrigerant can be realized by setting M10 to within this range. An embodiment of the present technology achieves flexibility of hose for transportation of refrigerant by using, as the material of the outer layer and inner layer of the hose for transportation of refrigerant, a thermoplastic resin composition having a sea-island structure rather than a typical thermoplastic resin.

The 10% modulus is defined as follows.

The 10% modulus can be measured in accordance with JIS (Japanese Industrial Standard) K6301 "Physical Testing Methods for Vulcanized Rubber", and is an indicator of flexibility.

The M10 of the thermoplastic resin composition A and the thermoplastic resin composition B can be controlled by changing the content of the elastomer contained in the thermoplastic resin composition A and the thermoplastic resin composition B (or in other words, changing the volume ratio of the domain).

The thermoplastic resin composition A and the thermoplastic resin composition B preferably contain the domain at 50 vol % or more. The proportion of the domain in the thermoplastic resin composition A and the proportion of the domain in the thermoplastic resin composition B are more preferably from 50 to 80 vol %, and even more preferably from 65 to 75 vol %. A flexible hose for transportation of refrigerant can be realized while maintaining low gas permeability by setting the proportion of the domains to within the range described above. Flexibility of the hose for transportation of refrigerant can be improved while maintaining low gas permeability by using, as the materials of the outer layer and the inner layer of the hose for transportation of refrigerant, a thermoplastic resin composition having a sea-island structure rather than a general thermoplastic resin, and increasing the volume ratio of the island (domain).

An embodiment of the present technology realizes a hose for transportation of refrigerant being lightweight and flexible and excellent in both low gas permeability and low water vapor permeability, the hose for transportation of refrigerant including an inner layer, a reinforcing layer, and an outer layer, by using, in the inner layer, a thermoplastic elastomer having low gas permeability, flexibility, and a sea-island structure, and using, in the outer layer, a thermoplastic elastomer having low water vapor permeability, flexibility, and a sea-island structure.

The elongation at break of the thermoplastic resin composition A and the thermoplastic resin composition B at a temperature of 25° C. is preferably 100% or higher, more preferably 150% or higher, and even more preferably 300% or higher.

The strength at break of the thermoplastic resin composition A and the thermoplastic resin composition B at a temperature of 25° C. is preferably 10 MPa or higher, more preferably 12 MPa or higher, and even more preferably 15 MPa or higher.

The elongation at break of the thermoplastic resin composition A and the thermoplastic resin composition B at a temperature of 150° C. is preferably 100% or higher, more preferably 150% or higher, and even more preferably 200% or higher.

The strength at break of the thermoplastic resin composition A and the thermoplastic resin composition B at a temperature of 150° C. is preferably 3 MPa or higher, more preferably 4 MPa or higher, and even more preferably 5 MPa or higher.

Setting the elongation at break and the strength at break of the thermoplastic resin composition A and the thermoplastic resin composition B at 25° C., and setting the elongation at break and the strength at break at a temperature of 150° C. to within the ranges described above results in an improvement in the heat resistance and heat aging resistance of the hose for transportation of refrigerant.

The thermoplastic resin composition A and the thermoplastic resin composition B preferably include a thermoplastic resin having a melting point of 150° C. or higher. In other words, the thermoplastic resin constituting the matrix of the thermoplastic resin composition A and the matrix of the thermoplastic resin composition B preferably has a melting point of 150° C. or higher, and in a case in which the matrix of the thermoplastic resin composition A and the matrix of the thermoplastic resin composition B contain a plurality of thermoplastic resins, at least one of the plurality of thermoplastic resins preferably has a melting point of 150° C. or higher. The heat resistance of the hose for transportation of refrigerant is improved by including a thermoplastic resin having a melting point of 150° C. or higher. The melting point of the thermoplastic resin is more preferably from 155 to 250° C., and even more preferably from 170 to 235° C.

The thermoplastic resin constituting the matrix of the thermoplastic resin composition A is not limited as long as the water vapor permeability coefficient and 10% modulus of the thermoplastic resin composition A are within the ranges described above, but preferably includes at least one type selected from the group consisting of a polyamide, a polyester, a polyvinyl alcohol, and a polyketone.

The thermoplastic resin constituting the matrix of the thermoplastic resin composition B is not limited as long as the water vapor permeability coefficient and 10% modulus of the thermoplastic resin composition B are within the ranges described above, but preferably includes at least one type selected from the group consisting of a polyamide, a polyester, a polyvinyl alcohol, and a polyketone.

Examples of the polyamide include nylon 6, nylon 66, nylon 11, nylon 12, nylon 610, a nylon 6/66 copolymer, a nylon 6/12 copolymer, nylon 46, nylon 6T, nylon 9T, and nylon MXD6, and of these, nylon 6 is preferable.

Examples of the polyester include poly(ethylene terephthalate), poly(butylene terephthalate), poly(ethylene naphthalate), and poly(butylene naphthalate), and of these, poly(butylene terephthalate) is preferable.

Examples of the polyvinyl alcohol include polyvinyl alcohol, ethylene-vinyl alcohol copolymers, and modified ethylene-vinyl alcohol copolymers, and of these, ethylene-vinyl alcohol copolymers are preferable.

Examples of the polyketone include ketone-ethylene copolymers, and ketone-ethylene-propylene terpolymers, and ketone-ethylene-propylene terpolymers are preferable.

The elastomer constituting the domain of the thermoplastic resin composition A is not limited as long as the water vapor permeability coefficient and 10% modulus of the thermoplastic resin composition A are within the ranges described above, but preferably includes at least one type selected from the group consisting of olefin-based elastomers and butyl-based elastomers.

The elastomer constituting the domain of the thermoplastic resin composition B is not limited as long as the water vapor permeability coefficient and 10% modulus of the thermoplastic resin composition B are within the ranges described above, but preferably includes at least one type selected from the group consisting of olefin-based elastomers and butyl-based elastomers.

Examples of the olefin-based elastomers include ethylene-α-olefin copolymers, ethylene-ethyl acrylate copolymers, maleic acid anhydride-modified ethylene-α-olefin copolymers, maleic acid anhydride-modified ethylene-ethyl acrylate copolymers, and ethylene-glycidyl methacrylate copolymers, and of these, maleic acid anhydride-modified ethylene-α-olefin copolymers is preferable.

Examples of the butyl-based elastomers include butyl rubber, halogenated butyl rubber, isobutylene-para-methylstyrene copolymer rubber, halogenated isobutylene-para-methylstyrene copolymer rubber, and a styrene-isobutylene-styrene block copolymer, and of these, the halogenated isobutylene-para-methylstyrene copolymer rubber is preferable.

In a case in which a polyamide is used as the thermoplastic resin constituting the matrix of the thermoplastic resin composition A, a polyamide having an amide group concentration of from 3.0 to 8.0 mmol/g is preferably used. Examples of polyamides having an amide group concentration of from 3.0 to 8.0 mmol/g include nylon 12.

In a case in which a polyamide is used as the thermoplastic resin constituting the matrix of the thermoplastic resin composition B, a polyamide having an amide group concentration of from 4.0 to 10.0 mmol/g is preferably used. Examples of polyamides having an amide group concentration of from 4.0 to 10.0 mmol/g include nylon 6.

Here, the structural formulas of the constituent components including amino acids and residues of lactams, diamines, and dicarboxylic acids are identified through ordinary analysis methods, the molecular weights thereof are calculated, and the amide group concentration is then expressed by the following formula.

$$\text{Amide group concentration (mol/g)}=\text{(number of amide groups in structural unit)/(molecular weight of structural unit)}$$

In the above formula, the molecular weight of the structural unit refers to the molecular weight of the repeating structural unit constituting the polyamide. In the case of a polyamide having an amino acid as a constituent component, the molecular weight of the structural unit is equal to a value obtained by subtracting the molecular weight of one water molecule from the molecular weight of the amino acid. In the case of a polyamide having a lactam as a constituent component, the molecular weight of the structural unit is equal to the molecular weight of the lactam. In the case of a polyamide having residues of a diamine and dicarboxylic acid as constituent components, the molecular weight of the structural unit is equal to a value obtained by subtracting the molecular weight of two water molecules from the sum of the molecular weight of the dicarboxylic acid and the molecular weight of the diamine.

The thermoplastic resin composition A preferably includes nylon 12 in the matrix and a modified butyl rubber in the domain. Note that the modified butyl rubber refers to a halogenated isobutylene-para-methylstyrene copolymer rubber. Using, in the outer layer, a thermoplastic resin composition including a matrix of nylon 12 and a domain of modified butyl rubber provides the advantages of low moisture vapor permeability and flexibility.

The thermoplastic resin composition B most preferably includes nylon 6 in the matrix and a modified butyl rubber in the domain. Using, in the inner layer, a thermoplastic resin composition including a matrix of nylon 6 and a domain of modified butyl rubber provides the advantages of low gas permeability and flexibility.

The thermoplastic resin composition A and the thermoplastic resin composition B preferably include a phenylenediamine-based or quinoline-based anti-aging agent or a trihydric alcohol having a triazine backbone. Including a phenylenediamine-based or quinoline-based anti-aging agent or a trihydric alcohol having a triazine backbone leads to an improvement in processability by contributing to crosslinking of the olefin-based elastomer and the butyl-based elastomer.

The phenylenediamine-based anti-aging agent refers to an anti-aging agent having, in the molecular structure thereof, an aromatic ring having two secondary amines as substituents, and is preferably at least one selected from the group consisting of N-phenyl-N'-(1,3-dimethylbutyl)-p-phenylenediamine, N-phenyl-N'-(1-methylheptyl)-p-phenylenediamine, N-phenyl-N'-isopropyl-p-phenylenediamine, N,N'-di-2-naphthyl-p-phenylenediamine, and N,N'-diphenyl-p-phenylenediamine, and is more preferably N-phenyl-N'-(1,3-dimethylbutyl)-p-phenylenediamine.

The quinoline-based anti-aging agent refers to an anti-aging agent having a quinoline backbone in the molecular structure, and is preferably a 2,2,4-trimethyl-1,2-dihydroquinoline polymer.

The trihydric alcohol having a triazine backbone is not particularly limited, but is preferably tris(2-hydroxyethyl) isocyanurate.

The blended amount of the phenylenediamine-based anti-aging agent or the quinoline anti-aging agent is preferably from 0.1 to 10 parts by mass, and more preferably from 0.1 to 5.0 parts by mass, per 100 parts by mass of the total of the thermoplastic resin compositions.

The blended amount of the trihydric alcohol having the triazine backbone is preferably from 0.1 to 10 parts by mass, and more preferably from 0.1 to 5.0 parts by mass, per 100 parts by mass of the total of the thermoplastic resin compositions.

The thermoplastic resin composition A and the thermoplastic resin composition B preferably include at least one type of processing aid. The processing aid contributes to improved extrusion processability of the thermoplastic resin compositions along with the viscosity stabilizer.

The processing aid is not particularly limited, but is preferably at least one type selected from a fatty acid, a fatty acid metal salt, a fatty acid ester, and a fatty acid amide.

Examples of the fatty acid include stearic acid, palmitic acid, lauric acid, oleic acid, and linoleic acid, and stearic acid is preferable.

Examples of the fatty acid metal salt include calcium stearate, potassium stearate, zinc stearate, magnesium stearate, and sodium stearate, and calcium stearate is preferable.

Examples of the fatty acid ester include glycerin monostearate, sorbitan stearate, stearyl stearate, and ethylene glycol distearate.

Examples of the fatty acid amide include stearic acid monoamides, oleic acid monoamides, and ethylene bis stearic acid amides.

The content of the processing aid is preferably from 0.2 to 10 mass %, more preferably from 1 to 8 mass %, and even more preferably from 1 to 5 mass %, with the mass of the thermoplastic resin composition being assigned as the reference.

The thermoplastic resin composition A and the thermoplastic resin composition B preferably contain at least one viscosity stabilizer. Including the viscosity stabilizer suppresses an increase in viscosity during extrusion molding of the thermoplastic resin composition, and can effectively reduce the occurrence of residual matter, and thus processability is improved.

Examples of the viscosity stabilizer include divalent metal oxides, ammonium salts, and carboxylates.

Examples of divalent metal oxides includes zinc oxide, magnesium oxide, copper oxide, calcium oxide, and iron oxide, but the divalent metal oxide is preferably zinc oxide or magnesium oxide, and more preferably zinc oxide.

Examples of the ammonium salts include ammonium carbonate, ammonium bicarbonate, ammonium chloride, ammonium bromide, ammonium sulfate, ammonium nitrate, ammonium acetate, and alkylammonium.

Examples of the carboxylates include sodium acetate, potassium acetate, zinc acetate, copper acetate, sodium oxalate, ammonium oxalate, calcium oxalate, and iron oxalate.

The viscosity stabilizer is most preferably zinc oxide.

The content of the viscosity stabilizer is preferably from 0.1 to 30 mass %, more preferably from 0.5 to 20 mass %, and even more preferably from 0.5 to 5 mass %, with the mass of the thermoplastic resin composition being assigned as the reference.

Preferably, 50 mass % or more of the viscosity stabilizer is included in the matrix. Including 50 mass % or more of the viscosity stabilizer in the matrix suppresses an increase in viscosity during extrusion molding of the thermoplastic resin composition, and can effectively reduce the occurrence of residual matter, and thus processability is improved.

The thermoplastic resin composition A and the thermoplastic resin composition B can include various additives in addition to the components described above.

The water vapor permeation amount of the hose for transportation of refrigerant is 6.0 mg/(240 h)·cm$^2$) or less, preferably 3 mg/(240 h)·cm$^2$) or less, and more preferably 2.0 mg/(240 h)·cm$^2$) or less. When the water vapor permeation amount is too high, moisture in the outside air penetrates into the hose for transportation of refrigerant and can cause freezing of moisture inside the air conditioner.

The water vapor permeation amount of the hose is defined as follows.

The water vapor permeation amount of the hose is the amount of water vapor permeation that occurs per 1 cm$^2$ of outer surface area in 240 hours under stipulated temperature and humidity conditions.

The permeation amount of hydrofluoroolefin HFO-1234yf (hereinafter, may be referred to simply as the "hydrofluoroolefin permeation amount") into the hose for transportation of refrigerant is 170 g/(m$^2$·72 h) or less, preferably 120 g/(m$^2$·72 h) or less, and more preferably 20 g/(m$^2$·72 h) or less. When the hydrofluoroolefin permeation amount is too high, the refrigerant in the hose for transportation of refrigerant penetrates into the material constituting the hose, and thereby facilitates leakage of the refrigerant to the outside.

The hydrofluoroolefin permeation amount into the hose is defined as follows.

The hydrofluoroolefin permeation amount into the hose is the permeation amount of hydrofluoroolefin per 1 m$^2$ of outer surface area in 72 hours under stipulated temperature and humidity conditions.

The mass per 1 m$^2$ of the outer surface area of the hose for transportation of refrigerant is 3000 g/m$^2$ or less, preferably 2000 g/m$^2$ or less, and more preferably 1700 g/m$^2$ or less. The demand for weight reductions in automobiles can be met by setting the mass per 1 m$^2$ of the outer surface area of the hose for transportation of refrigerant to within the range described above. An embodiment of the present technology achieves a lighter weight hose for transportation of refrigerant by using, in place of rubber, a thermoplastic resin composition having a sea-island structure as the material of the outer layer of the hose for transportation of refrigerant.

The hose for transportation of refrigerant preferably does not include a rubber layer that requires a vulcanization step. By not including a rubber layer that requires a vulcanization step, the hose can be manufactured without a vulcanization step, and thus labor and costs for manufacturing the hose for transportation of refrigerant can be reduced.

The thickness of the inner layer of the hose for transportation of refrigerant is preferably from 0.05 to 2 mm, more preferably from 0.1 to 1.8 mm, and even more preferably from 0.1 to 1.5 mm.

The thickness of the outer layer of the hose for transportation of refrigerant is preferably from 0.05 to 2 mm, more preferably from 0.1 to 1.8 mm, and even more preferably from 0.1 to 0.8 mm.

When the thicknesses of the inner layer and the outer layer of the hose for transportation of refrigerant are within the ranges described above, low gas permeability, low water vapor permeability, and a weight reduction can be compatibly achieved.

The hose for transportation of refrigerant can preferably include an adhesive layer between the inner layer and the reinforcing layer and/or between the reinforcing layer and the outer layer. The adhesive layer can be formed by an adhesive such as a urethane-based adhesive, an epoxy-based adhesive, an acrylic-based adhesive, a modified silicon-based adhesive, and an acid-modified polyolefin-based adhesive.

The method for manufacturing the hose for transportation of refrigerant is not particularly limited, and the hose for transportation of refrigerant can be manufactured as follows. First, the inner layer is extruded into a tube shape by extrusion molding, then a fiber which is to serve as the reinforcing layer is braided on the tube, and further the fiber is covered with the outer layer by extrusion molding of the outer tube on the fiber.

EXAMPLES

Raw Materials

The raw materials used in the following examples and comparative examples are as follows.

Thermoplastic Resin

Nylon 11: Nylon 11 "RILSAN" (trade name) BESNO TL, available from Arkema S.A., melting point of 187° C.

Nylon 6: Nylon 6 "Ube Nylon" 1011FB, available from Ube Industries, Ltd., melting point of 225° C.

Nylon 6/12: Nylon 6/12 copolymer "UBE Nylon" 7024B, available from Ube Industries, Ltd., melting point of 201° C.

Nylon 6/66: Nylon 6/66 copolymer "UBE Nylon" 5023B, available from Ube Industries, Ltd., melting point of 195° C.

Nylon 12: Nylon 12 "UBESTA" (trade name) 3012 U, available from Ube Industries, Ltd., melting point of 176° C.

EVOH: ethylene-vinyl alcohol copolymer (ethylene amount: 48%) "Soarnol" (trade name) H4815, available from Nippon Synthetic Chemical Industry Co., Ltd., melting point of 158° C.

PBT: polybutylene terephthalate "Novaduran" (trade name) 5010R, available from Mitsubishi Engineering-Plastics Corporation, melting point of 224° C.

Elastomer

Butyl rubber: brominated isobutylene-p-methylstyrene copolymer rubber "EXXPRO" (trade name) 3745, available from ExxonMobil Chemical Co.

Olefin-based rubber: maleic acid-modified α-olefin copolymer "Tafmer" MH7020, available from Mitsui Chemicals, Inc.

TPEE: polyester-based thermoplastic elastomer "Hytrel" (trade name) SB754, available from Du Pont-Toray Co., Ltd.

Viscosity Stabilizer

Zinc oxide: Zinc Oxide III, available from Seido Chemical Industry Co., Ltd.

Processing Aid

Stearic acid: industrial stearic acid, available from Chiba Fatty Acid Co., Ltd.

Calcium stearate: Calcium Stearate SC-PG, available from Sakai Chemical Industry Co., Ltd.

Anti-Aging Agent

Phenylenediamine-based anti-aging agent: N-phenyl-N'-(1,3-dimethylbutyl)-p-phenylenediamine "SANTOFLEX" (trade name) 6PPD, available from Solutia Inc.

Examples 1 to 16

Each of the thermoplastic resin compositions A and the thermoplastic resin compositions B described in Tables 1 to 3 were prepared by the following method. First, the halogenated butyl rubber was processed into a pellet shape using a rubber pelletizer (available from Moriyama MFG. Co., Ltd.). Next, the thermoplastic resin and zinc oxide were mixed to achieve a zinc oxide content of 50 mass %, and a viscosity stabilizer master batch was produced. At this time, in compounding proportions in which a plurality of thermoplastic resins were used, the master batch was prepared using the compounding proportion with the larger blending amount. Next, each of the raw materials was charged into a twin screw extruder (available from The Japan Steel Works, Ltd.) at the compounding ratios shown in Tables 1 to 3, and kneaded for 3 minutes at 235° C. The kneaded product was extruded continuously in a strand-like form from the extruder, cooled with water, and then cut using a cutter to obtain a pellet-shaped thermoplastic elastomer composition. At this time, a viscosity stabilizer (zinc oxide) was added to the master batch at the desired blending amount. Once the viscosity stabilizer is made into the master batch with the thermoplastic resins and added, the viscosity stabilizer is present in the matrix.

The water vapor permeability coefficient, oxygen permeability coefficient, and 10% modulus were measured for each of the obtained thermoplastic resin compositions A and thermoplastic resin compositions B. The measurement results are shown in Tables 1 to 3.

The thermoplastic resin composition B was extruded by an extruder into a tube shape having a thickness shown in Tables 1 to 3 and onto a mandrel coated in advance with a release agent. A reinforcing yarn of polyester was braided thereon using a braiding machine, after which the thermoplastic resin composition A was extruded, by an extruder, onto the reinforcing yarn in a tube shape having a thickness shown in Tables 1 to 3. And the mandrel was removed, and thereby a hose having an inner layer, a reinforcing layer, and an outer layer was manufactured. The water vapor permeation amount, the hydrofluoroolefin permeation amount, and the mass per 1 m² of outer surface area were measured for each manufactured hose. The measurement results are shown in Tables 1 to 3.

Comparative Example 1

A rubber composition was prepared in a Banbury mixer according to the compounding proportion shown in Table 4, and a tube having a wall thickness of 1.9 mm was extruded by an extruder onto a mandrel coated with a release agent in advance. This was used as an inner layer. A reinforcing yarn of polyester was braided on the inner layer using a braiding machine, and a rubber composition prepared with a Banbury mixer in the compounding proportions listed in Table 5 was extruded onto the reinforcing yarn. Subsequently, steam vulcanization was performed at 160° C. for 60 minutes, and the mandrel was pulled out, and a hose including an inner layer, a reinforcing layer, and an outer layer was manufactured.

The water vapor permeation amount, the hydrofluoroolefin permeation amount, and the mass per 1 m² of outer surface area were measured for each manufactured hose. The measurement results are shown in Table 3.

Comparative Example 2

A pellet-shaped thermoplastic resin composition B was obtained by the same method as in Examples 1 to 16. The water vapor permeability coefficient, oxygen permeability coefficient, and 10% modulus were measured for the obtained thermoplastic resin composition B. The measurement results are shown in Table 3.

The thermoplastic resin composition B was extruded by an extruder into a tube shape having a thickness shown in Table 3 onto a mandrel coated in advance with a release agent. A reinforcing yarn of polyester was braided thereon using a braiding machine. A polyester-based thermoplastic elastomer ("Hytrel" (trade name) SB754, available from Du Pont-Toray Co., Ltd.) was extruded on the reinforcing yarn by an extruder into a tube shape having a thickness of 0.4 mm, and the mandrel was pulled off, and a hose having an inner layer, a reinforcing layer, and an outer layer was manufactured. The water vapor permeation amount, the hydrofluoroolefin permeation amount, and the mass per 1 m² of outer surface area were measured for each manufactured hose. The measurement results are shown in Table 3.

Measurement of Water Vapor Permeability Coefficient

A sample of the thermoplastic resin composition or the rubber composition was formed into a sheet with an average thickness of 0.2 mm using a 40 mm φ single screw extruder (available from Pla Giken Co., Ltd.) equipped with a 200-mm wide T dice, with the temperatures of the cylinder and the dice set to a temperature of 10° C. plus the melting point of the polymer component having the highest melting point in the sample composition, and at a cooling roll temperature of 50° C. and a take-up speed of 3 m/min.

The obtained sheet was cut out and measured at a temperature of 60° C. and a relative humidity of 100% using a water vapor permeation tester available from GTR Tec Corporation.

Measurement of Oxygen Permeability Coefficient

The sheet manufactured for measuring the water vapor permeability coefficient was cut out and measured at a temperature of 21° C. and a relative humidity of 50% using the OXTRAN 1/50, available from Mocon Corporation.

Measurement of 10% modulus, strength at break, and elongation at break

A sheet having an average thickness of 0.2 mm and manufactured to measure the water vapor permeability coefficient was punched into a JIS No. 3 dumbbell shape and then subjected to a tensile test at a temperature of 25° C. and a speed of 500 mm/min in accordance with JIS K6301 "Physical Testing Methods for Vulcanized Rubber". From an obtained stress-strain curve, the stress (10% modulus) at 10% elongation, the stress when broken (strength at break), and the elongation when broken (elongation at break) were determined.

The tensile test was also performed at a high temperature of 150° C. and a speed of 500 mm/min. The stress when broken (strength at break) and the elongation when broken (elongation at break) were determined from the obtained stress-strain curve.

Evaluation of Extrudability

The prepared pellet-shaped thermoplastic resin composition was extruded at 235° C. using a T-die sheet forming device (available from Tomi Machinery Co., Ltd.), then drawn onto a cooling roll of metal, pulled by a pinch roll, and then wound by a winding machine, and thereby a film of the thermoplastic resin composition was manufactured. When the thickness of each film was set to 100 μm, cases in which the film could be molded without any problems were evaluated as being good, and cases in which problems occurred such as minor grains, minor hole formation, or minor cuts in the sheet end portions were evaluated as being fair, and serious problems such as major grains, major hole formation, or major cuts in the sheet end portions were evaluated as poor.

13

14

Measurement of Water Vapor Permeation Amount into Hose

A sample hose that had been left in an oven at 50° C. for 5 hours was filled with a drying agent having a volume corresponding to 80% of the inner volume of the sample hose and was then sealed. The hose was then left to stand in an atmosphere with a temperature of 50° C. and a relative humidity of 95%, the mass of the drying agent was measured after 120 hours and after 360 hours, and the increase in the mass of the drying agent between 120 hours and 360 hours was calculated, the increase amount of the mass during the 240 hour period thereof was divided by the outer surface area of the sample hose, and the permeability coefficient [mg/(240 h·cm²)] of moisture, which indicates the permeation amount of moisture, was calculated.

Measurement of Hydrofluoroolefin Permeation Amount into Hose

The amount of hydrofluoroolefin permeating the hose was measured in accordance with the JRA standard (standard of the Japan Refrigeration and Air Conditioning Industry Association) JRA 2001. A 0.45 m long sample hose was filled with a refrigerant (HFO-1234yf) at an amount of 0.6±0.1 g per 1 cm³ of the internal volume of the hose. The hose was then left to stand at 100° C. for 96 hours, the mass was measured after 24 hours and after 96 hours, the amount of decrease in mass (gas permeation amount) between 24 hours and 96 hours was calculated, this amount of mass decrease during the 72 hour period was divided by the outer surface area of the hose, and the permeability coefficient [g/(m²·72 h)] of the hydrofluoroolefin gas was calculated.

Measurement of Mass Per 1 m² of Hose Outer Surface Area

The mass per a length of 1 m of the sample hose was measured and then divided by the outer surface area to thereby calculate the mass per 1 m² of the hose outer surface area.

TABLE 1-1

| | | | Example 1 | Example 2 | Example 3 |
|---|---|---|---|---|---|
| Thermoplastic resin composition B (inner layer) | Nylon 11 | Parts by mass | 32.8 | 32.8 | 32.8 |
| | Nylon 6 | Parts by mass | | | |
| | Nylon 6/12 | Parts by mass | | | |
| | Nylon 6/66 | Parts by mass | | | |
| | EVOH | Parts by mass | | | |
| | PBT | Parts by mass | | | |
| | Butyl-based rubber | Parts by mass | 61.1 | 61.1 | 61.1 |
| | Olefin-based rubber | Parts by mass | | | |
| | Zinc oxide | Parts by mass | 3.1 | 3.1 | 3.1 |
| | Stearic acid | Parts by mass | 0.9 | 0.9 | 0.9 |
| | Calcium stearate | Parts by mass | 1.2 | 1.2 | 1.2 |
| | Phenylenediamine-based anti-aging agent | Parts by mass | 0.9 | 0.9 | 0.9 |
| | Total | Parts by mass | 100.0 | 100.0 | 100.0 |
| | Rubber volume fraction | vol % | 65.0 | 65.0 | 65.0 |
| | Water vapor permeability coefficient | *1) | 2.4 | 2.4 | 2.4 |
| | Oxygen permeability coefficient | *2) | 0.0500 | 0.0500 | 0.0500 |
| | 10% modulus | MPa | 6.5 | 6.5 | 6.5 |
| | Strength at break (25° C.) | MPa | 24.1 | 24.1 | 24.1 |
| | Elongation at break (25° C.) | % | 408 | 408 | 408 |
| | Strength at break (150° C.) | MPa | 5.3 | 5.3 | 5.3 |
| | Elongation at break (150° C.) | % | 290 | 290 | 290 |
| | Thickness | mm | 0.7 | 0.7 | 0.7 |
| | Extrudability | | Good | Good | Good |
| Thermoplastic resin composition A (outer layer) | Nylon 11 | Parts by mass | 32.8 | | |
| | Nylon 12 | Parts by mass | | 32.6 | |
| | Nylon 6 | Parts by mass | | | 53.1 |
| | EVOH | Parts by mass | | | |
| | PBT | Parts by mass | | | |
| | Butyl-based rubber | Parts by mass | 61.1 | 61.3 | |
| | Olefin-based rubber | Parts by mass | | | 42.7 |
| | Zinc oxide | Parts by mass | 3.1 | 3.1 | 2.8 |
| | Stearic acid | Parts by mass | 0.9 | 1.0 | 0.4 |

TABLE 1-1-continued

|  |  |  | Example 1 | Example 2 | Example 3 |
|---|---|---|---|---|---|
|  | Calcium stearate | Parts by mass | 1.2 | 1.2 | 0.7 |
|  | Phenylenediamine-based anti-aging agent | Parts by mass | 0.9 | 0.9 | 0.4 |
|  | Total | Parts by mass | 100.0 | 100.0 | 100.0 |
|  | Rubber volume fraction | vol % | 65.0 | 65.0 | 50.0 |
|  | Water vapor permeability coefficient | *1) | 2.4 | 2.3 | 10.0 |
|  | Oxygen permeability coefficient | *2) | 0.0500 | 0.0491 | 0.0065 |
|  | 10% modulus | MPa | 6.5 | 5.9 | 9.4 |
|  | Strength at break (25° C.) | MPa | 24.1 | 15.1 | 52.7 |
|  | Elongation at break (25° C.) | % | 408 | 350 | 502 |
|  | Strength at break (150° C.) | MPa | 5.3 | 5.0 | 3.6 |
|  | Elongation at break (150° C.) | % | 290 | 400 | 111 |
|  | Thickness | mm | 0.4 | 0.4 | 0.4 |
| HOSE | Water vapor permeation amount | *3) | 1.2 | 1.2 | 1.3 |
|  | Hydrofluorocarbon permeation amount | *4) | 163 | 163 | 92 |
|  | Weight per 1 m² of outer surface area | g/m² | 1610 | 1603 | 1608 |
|  | Vulcanization step |  | None | None | None |

*1) Water vapor permeability coefficient units: g · mm/(m² · 24 h)
*2) Oxygen permeability coefficient units: cm³ · mm/(m² · day · mmHg)
*3) Water vapor permeation amount units: mg/(240 h · cm²)
*4) Hydrofluorocarbon permeation amount units: g/(m² · 72 h)

TABLE 1-2

|  |  |  | Example 4 | Example 5 | Example 6 |
|---|---|---|---|---|---|
| Thermoplastic resin composition B (inner layer) | Nylon 11 | Parts by mass | 32.8 |  |  |
|  | Nylon 6 | Parts by mass |  | 40.6 | 39.8 |
|  | Nylon 6/12 | Parts by mass |  |  |  |
|  | Nylon 6/66 | Parts by mass |  |  |  |
|  | EVOH | Parts by mass |  |  |  |
|  | PBT | Parts by mass |  |  |  |
|  | Butyl-based rubber | Parts by mass | 61.1 | 54.0 | 60.2 |
|  | Olefin-based rubber | Parts by mass |  |  |  |
|  | Zinc oxide | Parts by mass | 3.1 | 2.5 |  |
|  | Stearic acid | Parts by mass | 0.9 | 1.2 |  |
|  | Calcium stearate | Parts by mass | 1.2 | 1.1 |  |
|  | Phenylenediamine-based anti-aging agent | Parts by mass | 0.9 | 0.6 |  |
|  | Total | Parts by mass | 100.0 | 100.0 | 100.0 |
|  | Rubber volume fraction | vol % | 65.0 | 65.0 | 65.0 |
|  | Water vapor permeability coefficient | *1) | 2.4 | 6.0 | 6.0 |
|  | Oxygen permeability coefficient | *2) | 0.0500 | 0.0077 | 0.0077 |
|  | 10% modulus | MPa | 6.5 | 5.2 | 5.2 |
|  | Strength at break (25° C.) | MPa | 24.1 | 28.5 | 28.4 |
|  | Elongation at break (25° C.) | % | 408 | 420 | 415 |
|  | Strength at break (150° C.) | MPa | 5.3 | 7.6 | 7.6 |

TABLE 1-2-continued

| | | | Example 4 | Example 5 | Example 6 |
|---|---|---|---|---|---|
| | Elongation at break (150° C.) | % | 290 | 290 | 288 |
| | Thickness | mm | 0.7 | 0.7 | 0.7 |
| | Extrudability | | Good | Good | Fair |
| Thermoplastic resin composition A (outer layer) | Nylon 11 | Parts by mass | | | |
| | Nylon 12 | Parts by mass | | 32.6 | 32.6 |
| | Nylon 6 | Parts by mass | | | |
| | EVOH | Parts by mass | 40.9 | | |
| | PBT | Parts by mass | | | |
| | Butyl-based rubber | Parts by mass | | 61.3 | 61.3 |
| | Olefin-based rubber | Parts by mass | 59.1 | | |
| | Zinc oxide | Parts by mass | | 3.1 | 3.1 |
| | Stearic acid | Parts by mass | | 1.0 | 1.0 |
| | Calcium stearate | Parts by mass | | 1.2 | 1.2 |
| | Phenylenediamine-based anti-aging agent | Parts by mass | | 0.9 | 0.9 |
| | Total | Parts by mass | 100.0 | 100.0 | 100.0 |
| | Rubber volume fraction | vol % | 65.0 | 65.0 | 65.0 |
| | Water vapor permeability coefficient | *1) | 4.5 | 2.3 | 2.3 |
| | Oxygen permeability coefficient | *2) | 0.0007 | 0.0491 | 0.0491 |
| | 10% modulus | MPa | 9.2 | 5.9 | 5.9 |
| | Strength at break (25° C.) | MPa | 29.8 | 15.1 | 15.1 |
| | Elongation at break (25° C.) | % | 541 | 350 | 350 |
| | Strength at break (150° C.) | MPa | 8.1 | 5.0 | 5.0 |
| | Elongation at break (150° C.) | % | 360 | 400 | 400 |
| | Thickness | mm | 0.4 | 0.4 | 0.4 |
| HOSE | Water vapor permeation amount | *3) | 1.2 | 1.6 | 1.6 |
| | Hydrofluorocarbon permeation amount | *4) | 82 | 16 | 16 |
| | Weight per 1 m² of outer surface area | g/m² | 1624 | 1601 | 1601 |
| | Vulcanization step | | None | None | None |

*1) Water vapor permeability coefficient units: g · mm/(m² · 24 h)
*2) Oxygen permeability coefficient units: cm³ · mm/(m² · day · mmHg)
*3) Water vapor permeation amount units: mg/(240 h · cm²)
*4) Hydrofluorocarbon permeation amount units: g/(m² · 72 h)

TABLE 2-1

| | | | Example 7 | Example 8 | Example 9 |
|---|---|---|---|---|---|
| Thermoplastic resin composition B (inner layer) | Nylon 11 | Parts by mass | | | |
| | Nylon 6 | Parts by mass | 45.0 | 61.7 | 28.2 |
| | Nylon 6/12 | Parts by mass | | | 6.5 |
| | Nylon 6/66 | Parts by mass | | | |
| | EVOH | Parts by mass | | | |
| | PBT | Parts by mass | | | |
| | Butyl-based rubber | Parts by mass | 55.0 | 34.8 | 59.3 |
| | Olefin-based rubber | Parts by mass | | | |
| | Zinc oxide | Parts by mass | | 1.6 | 3.0 |
| | Stearic acid | Parts by mass | | 0.3 | 0.6 |
| | Calcium stearate | Parts by mass | | 0.8 | 0.9 |
| | Phenylenediamine-based anti-aging agent | Parts by mass | | 0.7 | 1.5 |
| | Total | Parts by mass | 100.0 | 100.0 | 100.0 |
| | Rubber volume fraction | vol % | 50.0 | 40.0 | 65.0 |

TABLE 2-1-continued

|  |  |  | Example 7 | Example 8 | Example 9 |
|---|---|---|---|---|---|
|  | Water vapor permeability coefficient | *1) | 6.5 | 7.0 | 3.7 |
|  | Oxygen permeability coefficient | *2) | 0.0065 | 0.0050 | 0.0100 |
|  | 10% modulus | MPa | 6.6 | 9.6 | 4.6 |
|  | Strength at break (25° C.) | MPa | 26.5 | 23.0 | 32.0 |
|  | Elongation at break (25° C.) | % | 350 | 320 | 440 |
|  | Strength at break (150° C.) | MPa | 8.0 | 9.0 | 7.3 |
|  | Elongation at break (150° C.) | % | 250 | 200 | 276 |
|  | Thickness | mm | 0.7 | 0.7 | 0.7 |
|  | Extrudability |  | Fair | Good | Good |
| Thermoplastic resin composition A (outer layer) | Nylon 11 | Parts by mass |  |  | 32.8 |
|  | Nylon 12 | Parts by mass | 32.6 | 32.6 |  |
|  | Nylon 6 | Parts by mass |  |  |  |
|  | EVOH | Parts by mass |  |  |  |
|  | PBT | Parts by mass |  |  |  |
|  | Butyl-based rubber | Parts by mass | 61.3 | 61.3 | 61.1 |
|  | Olefin-based rubber | Parts by mass |  |  |  |
|  | Zinc oxide | Parts by mass | 3.1 | 3.1 | 3.1 |
|  | Stearic acid | Parts by mass | 1.0 | 1.0 | 0.9 |
|  | Calcium stearate | Parts by mass | 1.2 | 1.2 | 1.2 |
|  | Phenylenediamine-based anti-aging agent | Parts by mass | 0.9 | 0.9 | 0.9 |
|  | Total | Parts by mass | 100.0 | 100.0 | 100.0 |
|  | Rubber volume fraction | vol % | 65.0 | 65.0 | 65.0 |
|  | Water vapor permeability coefficient | *1) | 2.3 | 2.3 | 2.4 |
|  | Oxygen permeability coefficient | *2) | 0.0491 | 0.0491 | 0.0500 |
|  | 10% modulus | MPa | 5.9 | 5.9 | 6.5 |
|  | Strength at break (25° C.) | MPa | 15.1 | 15.1 | 24.1 |
|  | Elongation at break (25° C.) | % | 350 | 350 | 408 |
|  | Strength at break (150° C.) | MPa | 5.0 | 5.0 | 5.3 |
|  | Elongation at break (150° C.) | % | 400 | 400 | 290 |
|  | Thickness | mm | 0.4 | 0.4 | 0.4 |
| HOSE | Water vapor permeation amount | *3) | 2.3 | 2.4 | 1.6 |
|  | Hydrofluoroolefin permeation amount | *4) | 16 | 12 | 16 |
|  | Weight per 1 m² of outer surface area | g/m² | 1607 | 1608 | 1630 |
|  | Vulcanization step |  | None | None | None |

*1) Water vapor permeability coefficient units: g · mm/(m² · 24 h)
*2) Oxygen permeability coefficient units: cm³ · mm/(m² · day · mmHg)
*3) Water vapor permeation amount units: mg/(240 h · cm²)
*4) Hydrofluoroolefin permeation amount units: g/(m² · 72 h)

TABLE 2-2

|  |  |  | Example 10 | Example 11 | Example 12 |
|---|---|---|---|---|---|
| Thermoplastic resin composition B (inner layer) | Nylon 11 | Parts by mass |  |  |  |
|  | Nylon 6 | Parts by mass | 28.2 | 28.2 | 28.2 |
|  | Nylon 6/12 | Parts by mass | 6.5 | 6.5 | 6.5 |
|  | Nylon 6/66 | Parts by mass |  |  |  |
|  | EVOH | Parts by mass |  |  |  |
|  | PBT | Parts by mass |  |  |  |

TABLE 2-2-continued

| | | | Example 10 | Example 11 | Example 12 |
|---|---|---|---|---|---|
| | Butyl-based rubber | Parts by mass | 59.3 | 59.3 | 59.3 |
| | Olefin-based rubber | Parts by mass | | | |
| | Zinc oxide | Parts by mass | 3.0 | 3.0 | 3.0 |
| | Stearic acid | Parts by mass | 0.6 | 0.6 | 0.6 |
| | Calcium stearate | Parts by mass | 0.9 | 0.9 | 0.9 |
| | Phenylenediamine-based anti-aging agent | Parts by mass | 1.5 | 1.5 | 1.5 |
| | Total | Parts by mass | 100.0 | 100.0 | 100.0 |
| | Rubber volume fraction | vol % | 65.0 | 65.0 | 65.0 |
| | Water vapor permeability coefficient | *1) | 3.7 | 3.7 | 3.7 |
| | Oxygen permeability coefficient | *2) | 0.0100 | 0.0100 | 0.0100 |
| | 10% modulus | MPa | 4.6 | 4.6 | 4.6 |
| | Strength at break (25° C.) | MPa | 32.0 | 32.0 | 32.0 |
| | Elongation at break (25° C.) | % | 440 | 440 | 440 |
| | Strength at break (150° C.) | MPa | 7.3 | 7.3 | 7.3 |
| | Elongation at break (150° C.) | % | 276 | 276 | 276 |
| | Thickness | mm | 0.7 | 0.7 | 0.7 |
| | Extrudability | | Good | Good | Good |
| Thermoplastic resin composition A (outer layer) | Nylon 11 | Parts by mass | | | |
| | Nylon 12 | Parts by mass | 32.6 | | |
| | Nylon 6 | Parts by mass | | 53.1 | |
| | EVOH | Parts by mass | | | 40.9 |
| | PBT | Parts by mass | | | |
| | Butyl-based rubber | Parts by mass | 61.3 | | |
| | Olefin-based rubber | Parts by mass | | 42.7 | 59.1 |
| | Zinc oxide | Parts by mass | 3.1 | 2.8 | |
| | Stearic acid | Parts by mass | 1.0 | 0.4 | |
| | Calcium stearate | Parts by mass | 1.2 | 0.7 | |
| | Phenylenediamine-based anti-aging agent | Parts by mass | 0.9 | 0.4 | |
| | Total | Parts by mass | 100.0 | 100.0 | 100.0 |
| | Rubber volume fraction | vol % | 65.0 | 50.0 | 65.0 |
| | Water vapor permeability coefficient | *1) | 2.3 | 10.0 | 4.5 |
| | Oxygen permeability coefficient | *2) | 0.0491 | 0.0065 | 0.0007 |
| | 10% modulus | MPa | 5.9 | 9.4 | 9.2 |
| | Strength at break (25° C.) | MPa | 15.1 | 52.7 | 29.8 |
| | Elongation at break (25° C.) | % | 350 | 502 | 541 |
| | Strength at break (150° C.) | MPa | 5.0 | 3.6 | 8.1 |
| | Elongation at break (150° C.) | % | 400 | 111 | 360 |
| | Thickness | mm | 0.4 | 0.4 | 1.8 |
| HOSE | Water vapor permeation amount | *3) | 1.6 | 6.0 | 2.0 |
| | Hydrofluoroolefin permeation amount | *4) | 16 | 16 | 16 |
| | Weight per 1 m² of outer surface area | g/m² | 1608 | 1602 | 2920 |
| | Vulcanization step | | None | None | None |

*1) Water vapor permeability coefficient units: g · mm/(m² · 24 h)
*2) Oxygen permeability coefficient units: cm³ · mm/(m² · day · mmHg)
*3) Water vapor permeation amount units: mg/(240 h · cm²)
*4) Hydrofluoroolefin permeation amount units: g/(m² · 72 h)

TABLE 3-1

| | | | Example 13 | Example 14 | Example 15 |
|---|---|---|---|---|---|
| Thermoplastic resin composition B (inner layer) | Nylon 11 | Parts by mass | | | |
| | Nylon 6 | Parts by mass | | 53.1 | |
| | Nylon 6/12 | Parts by mass | | | |
| | Nylon 6/66 | Parts by mass | 35.1 | | |
| | EVOH | Parts by mass | | | 44.2 |
| | PBT | Parts by mass | | | |
| | Butyl-based rubber | Parts by mass | 59.1 | | 55.8 |
| | Olefin-based rubber | Parts by mass | | 42.7 | |
| | Zinc oxide | Parts by mass | 3.0 | 2.1 | |
| | Stearic acid | Parts by mass | 0.8 | 0.4 | |
| | Calcium stearate | Parts by mass | 1.2 | 0.9 | |
| | Phenylenediamine-based anti-aging agent | Parts by mass | 1.0 | 0.9 | |
| | Total | Parts by mass | 100.0 | 100.0 | 100.0 |
| | Rubber volume fraction | vol % | 65.0 | 50.0 | |
| | Water vapor permeability coefficient | *1) | 6.0 | 10.0 | 2.8 |
| | Oxygen permeability coefficient | *2) | 0.0090 | 0.0065 | 0.0006 |
| | 10% modulus | MPa | 3.9 | 9.4 | 8.4 |
| | Strength at break (25° C.) | MPa | 30.4 | 52.7 | 10.4 |
| | Elongation at break (25° C.) | % | 426 | 502 | 114 |
| | Strength at break (150° C.) | MPa | 6.5 | 3.6 | 3.3 |
| | Elongation at break (150° C.) | % | 266 | 111 | 210 |
| | Thickness | mm | 0.7 | 0.7 | 0.1 |
| | Extrudability | | Good | Good | Good |
| Thermoplastic resin composition A (outer layer) | Nylon 11 | Parts by mass | | | |
| | Nylon 12 | Parts by mass | 32.6 | 32.6 | 32.6 |
| | Nylon 6 | Parts by mass | | | |
| | EVOH | Parts by mass | | | |
| | PBT | Parts by mass | | | |
| | Butyl-based rubber | Parts by mass | 61.3 | 61.3 | 61.3 |
| | Olefin-based rubber | Parts by mass | | | |
| | Zinc oxide | Parts by mass | 3.1 | 3.1 | 3.1 |
| | Stearic acid | Parts by mass | 1.0 | 1.0 | 1.0 |
| | Calcium stearate | Parts by mass | 1.2 | 1.2 | 1.2 |
| | Phenylenediamine-based anti-aging agent | Parts by mass | 0.9 | 0.9 | 0.9 |
| | Total | Parts by mass | 100.0 | 100.0 | 100.0 |
| | Rubber volume fraction | vol % | 65.0 | 65.0 | 65.0 |
| | Water vapor permeability coefficient | *1) | 2.3 | 2.3 | 2.3 |
| | Oxygen permeability coefficient | *2) | 0.0491 | 0.0491 | 0.0491 |
| | 10% modulus | MPa | 5.9 | 5.9 | 5.9 |
| | Strength at break (25° C.) | MPa | 15.1 | 15.1 | 15.1 |
| | Elongation at break (25° C.) | % | 350 | 350 | 350 |
| | Strength at break (150° C.) | MPa | 5.0 | 5.0 | 5.0 |
| | Elongation at break (150° C.) | % | 400 | 400 | 400 |
| | Thickness | mm | 0.1 | 0.4 | 0.4 |

TABLE 3-1-continued

|  |  |  | Example 13 | Example 14 | Example 15 |
|---|---|---|---|---|---|
| HOSE | Water vapor permeation amount | *3) | 2.0 | 5.8 | 3.0 |
|  | Hydrofluoroolefin permeation amount | *4) | 16 | 16 | 8 |
|  | Weight per 1 m² of outer surface area | g/m² | 1509 | 1610 | 801 |
|  | Vulcanization step |  | None | None | None |

*1) Water vapor permeability coefficient units: g · mm/(m² · 24 h)

*2) Oxygen permeability coefficient units: cm³ · mm/(m² · day · mmHg)

*3) Water vapor permeation amount units: mg/(240 h · cm²)

*4) Hydrofluoroolefin permeation amount units: g/(m² · 72 h)

TABLE 3-2

|  |  |  | Example 16 | Comparative Example 1 | Comparative Example 2 |
|---|---|---|---|---|---|
| Thermoplastic resin composition B (inner layer) | Nylon 11 | Parts by mass |  | Table 4 |  |
|  | Nylon 6 | Parts by mass |  |  | 28.2 |
|  | Nylon 6/12 | Parts by mass |  |  | 6.5 |
|  | Nylon 6/66 | Parts by mass |  |  |  |
|  | EVOH | Parts by mass |  |  |  |
|  | PBT | Parts by mass | 55.2 |  |  |
|  | Butyl-based rubber | Parts by mass |  |  | 59.3 |
|  | Olefin-based rubber | Parts by mass | 44.8 |  |  |
|  | Zinc oxide | Parts by mass |  |  | 3.0 |
|  | Stearic acid | Parts by mass |  |  | 0.6 |
|  | Calcium stearate | Parts by mass |  |  | 0.9 |
|  | Phenylenediamine-based anti-aging agent | Parts by mass |  |  | 1.5 |
|  | Total | Parts by mass | 100.0 |  | 100.0 |
|  | Rubber volume fraction | vol % |  |  | 65.0 |
|  | Water vapor permeability coefficient | *1) | 5.0 |  | 3.7 |
|  | Oxygen permeability coefficient | *2) | 0.0364 | 0.0455 | 0.0100 |
|  | 10% modulus | MPa | 8.7 | 1.6 | 4.6 |
|  | Strength at break (25° C.) | MPa | 17.3 | 12.1 | 32.0 |
|  | Elongation at break (25° C.) | % | 482 | 135 | 440 |
|  | Strength at break (150° C.) | MPa | 3.4 | 6.83 | 7.3 |
|  | Elongation at break (150° C.) | % | 111 | 91 | 276 |
|  | Thickness | mm | 1.8 | 1.9 | 0.7 |
|  | Extrudability |  | Good | Good | Good |
| Thermoplastic resin composition A (outer layer) | Nylon 11 | Parts by mass |  | Table 5 | TPEE |
|  | Nylon 12 | Parts by mass | 32.6 |  |  |
|  | Nylon 6 | Parts by mass |  |  |  |
|  | EVOH | Parts by mass |  |  |  |
|  | PBT | Parts by mass |  |  |  |
|  | Butyl-based rubber | Parts by mass | 61.3 |  |  |
|  | Olefin-based rubber | Parts by mass |  |  |  |
|  | Zinc oxide | Parts by mass | 3.1 |  |  |
|  | Stearic acid | Parts by mass | 1.0 |  |  |
|  | Calcium stearate | Parts by mass | 1.2 |  |  |
|  | Phenylenediamine-based anti-aging agent | Parts by mass | 0.9 |  |  |
|  | Total | Parts by mass | 100.0 |  |  |
|  | Rubber volume fraction | vol % | 65.0 |  |  |
|  | Water vapor permeability coefficient | *1) | 2.3 | 6.6 | 29.1 |

TABLE 3-2-continued

| | | Example 16 | Comparative Example 1 | Comparative Example 2 |
|---|---|---|---|---|
| Oxygen permeability coefficient | *2) | 0.0491 | 1.371 | 1.0624 |
| 10% modulus | MPa | 5.9 | 0.4 | 1.3 |
| Strength at break (25° C.) | MPa | 15.1 | 14.6 | 11.1 |
| Elongation at break (25° C.) | % | 350 | 661 | 890 |
| Strength at break (150° C.) | MPa | 5.0 | 6.6 | Unmeasurable |
| Elongation at break (150° C.) | % | 400 | 280 | Unmeasurable |
| Thickness | mm | 0.4 | 1 | 0.4 |
| HOSE Water vapor permeation amount | *3) | 4.0 | 1.6 | 7 |
| Hydrofluoroolefin permeation amount | *4) | 102 | 16 | 16 |
| Weight per 1 m² of outer surface area | g/m² | 3204 | 3700 | 1611 |
| Vulcanization step | | None | Yes | None |

*1) Water vapor permeability coefficient units: g · mm/(m² · 24 h)
*2) Oxygen permeability coefficient units: cm³ · mm/(m² · day · mmHg)
*3) Water vapor permeation amount units: mg/(240 h · cm²)
*4) Hydrofluoroolefin permeation amount units: g/(m² · 72 h)

TABLE 4

| Raw materials | Manufacturer Brand | Parts by mass |
|---|---|---|
| Brominated butyl rubber | EXXONMOBIL CHEMICAL COMPANY Exxon Bromobutyl 2255 | 100 |
| HAF grade carbon black | Showa Cabot K.K, Show Black (trade name) N330 | 50 |
| Paraffin oil | Showa Shell Sekiyu K.K. Machine oil 22 | 10 |
| Zinc oxide | Seido Chemical Industry Co., Ltd. Zinc Oxide No. 3 | 3 |
| Stearic acid | Nippon Oil & Fats Co., Ltd. Beads stearic acid | 1 |
| Sulfur | Hosoi Chemical Industry. Co., Ltd. Oil-treated sulfur | 1 |
| Vulcanization accelerator DM | Ouchi Shinko Chemical Industrial Co., Ltd. NOCCELLER (trade name) DM (dibenzothiazyl disulfide) | 2 |

TABLE 5

| Raw materials | Manufacturer Brand | Parts by mass |
|---|---|---|
| Ethylene-propylene-diene copolymer (EDPM) | Sumitomo Chemical Co., Ltd. Esprene (trade name) 505 | 100 |
| GPF grade carbon black | NSCC Carbon Co., Ltd. Niteron (trade name) #GN | 90 |
| Paraffin oil | Japan Sun Oil Company, Ltd. SUNPAR (trade name) 2280 | 30 |
| Zinc oxide | Seido Chemical Industry Co., Ltd. Zinc Oxide No. 3 | 5 |
| Stearic acid | Chiba Fatty Acid Co., Ltd. Stearic acid 50S | 1 |
| Sulfur | Hosoi Chemical Industry. Co., Ltd. Oil-treated sulfur | 0.8 |
| Vulcanization accelerator DM | Ouchi Shinko Chemical Industrial Co., Ltd. NOCCELLER (trade name) DM (dibenzothiazyl disulfide) | 2 |
| Vulcanization accelerator TT | Ouchi Shinko Chemical Industrial Co., Ltd. NOCCELLER (trade name) TT (tetramethylthiuram disulfide) | 1.5 |

TABLE 5-continued

| Raw materials | Manufacturer Brand | Parts by mass |
|---|---|---|
| Vulcanization retarder PVI | Ouchi Shinko Chemical Industrial Co., Ltd. Retarder CTP (N-(cyclohexylthio)phthalimide) | 0.3 |

The hose for transportation of refrigerant of an embodiment of the present technology is particularly suitably used as a hose for transporting a refrigerant of an air conditioner of an automobile.

The invention claimed is:

1. A hose for transportation of refrigerant comprising:
an inner layer;
a reinforcing layer; and
an outer layer;
the outer layer comprising a thermoplastic resin composition A having a sea-island structure comprising a matrix containing a thermoplastic resin and a domain containing an elastomer,
the inner layer comprising a thermoplastic resin composition B having a sea-island structure comprising a matrix containing a thermoplastic resin and a domain containing an elastomer,
a water vapor permeability coefficient of the thermoplastic resin composition A at a temperature of 60° C. and a relative humidity of 100% being 10.0 g·mm/(m²·24 h) or less,
an oxygen permeability coefficient of the thermoplastic resin composition B at a temperature of 21° C. and a relative humidity of 50% being 0.05 cm³·mm/(m²·day·mmHg) or less,
a water vapor permeation amount of the hose for transportation of refrigerant being 6.0 mg/(240 h·cm²) or less,
a hydrofluoroolefin HFO-1234yf permeation amount of the hose for transportation of refrigerant being 170 g/(m²·72 h) or less,
a mass per 1 m² of outer surface area of the hose for transportation of refrigerant being 3000 g/m² or less, the water vapor permeability coefficient of the thermoplastic resin composition A being smaller than a water vapor permeability coefficient of the thermoplastic resin composition B, the oxygen permeability coefficient of the thermoplastic resin composition B being smaller than an oxygen permeability coefficient of the thermoplastic resin composition A, and the thermoplastic resin composition A and the thermoplastic resin composition B being different.

2. The hose for transportation of refrigerant according to claim 1, wherein the thermoplastic resin composition A and the thermoplastic resin composition B have, at a temperature of 25° C., a 10% modulus of 10.0 MPa or less.

3. The hose for transportation of refrigerant according to claim 1, wherein the thermoplastic resin composition A and the thermoplastic resin composition B comprise the domain at 50 vol % or more.

4. The hose for transportation of refrigerant according to claim 1, wherein the thermoplastic resin composition A and the thermoplastic resin composition B have, at a temperature of 25° C., an elongation at break of 100% or higher and a strength at break of 10 MPa or higher, and have, at a temperature of 150° C., an elongation at break of 100% or higher and a strength at break of 3 MPa or higher.

5. The hose for transportation of refrigerant according to claim 1, wherein the hose for transportation of refrigerant does not comprise a rubber layer requiring a vulcanization step.

6. The hose for transportation of refrigerant according to claim 1, wherein the thermoplastic resin composition A and the thermoplastic resin composition B comprise a thermoplastic resin having a melting point of 150° C. or higher.

7. The hose for transportation of refrigerant according to claim 1, wherein the thermoplastic resin contained in the matrix of the thermoplastic resin composition A and the matrix of the thermoplastic resin composition B comprises at least one type selected from the group consisting of a polyamide, a polyester, a polyvinyl alcohol, and a polyketone, and the elastomer contained in the domain of the thermoplastic resin composition A and the domain of the thermoplastic resin composition B comprises at least one type selected from the group consisting of an olefin-based elastomer and a butyl-based elastomer.

8. The hose for transportation of refrigerant according to claim 1, wherein the thermoplastic resin composition A comprises nylon 12 in the matrix and a modified butyl rubber in the domain, and the thermoplastic resin composition B comprises nylon 6 in the matrix and a modified butyl rubber in the domain.

9. The hose for transportation of refrigerant according to claim 1, wherein the thermoplastic resin composition A and the thermoplastic resin composition B comprise a phenylenediamine-based or a quinoline-based anti-aging agent or a trihydric alcohol having a triazine backbone, at least one processing aid, and at least one viscosity stabilizer, and 50 mass % or more of the viscosity stabilizer is contained in the matrix.

10. The hose for transportation of refrigerant according to claim 2, wherein the thermoplastic resin composition A and the thermoplastic resin composition B comprise the domain at 50 vol % or more.

11. The hose for transportation of refrigerant according to claim 10, wherein the thermoplastic resin composition A and the thermoplastic resin composition B have, at a temperature of 25° C., an elongation at break of 100% or higher and a strength at break of 10 MPa or higher, and have, at a temperature of 150° C., an elongation at break of 100% or higher and a strength at break of 3 MPa or higher.

12. The hose for transportation of refrigerant according to claim 11, wherein the hose for transportation of refrigerant does not comprise a rubber layer requiring a vulcanization step.

13. The hose for transportation of refrigerant according to claim 12, wherein the thermoplastic resin composition A and the thermoplastic resin composition B comprise a thermoplastic resin having a melting point of 150° C. or higher.

14. The hose for transportation of refrigerant according to claim 13, wherein the thermoplastic resin contained in the matrix of the thermoplastic resin composition A and the matrix of the thermoplastic resin composition B comprises at least one type selected from the group consisting of a polyamide, a polyester, a polyvinyl alcohol, and a polyketone, and the elastomer contained in the domain of the thermoplastic resin composition A and the domain of the thermoplastic resin composition B comprises at least one type selected from the group consisting of an olefin-based elastomer and a butyl-based elastomer.

15. The hose for transportation of refrigerant according to claim 14, wherein the thermoplastic resin composition A comprises nylon 12 in the matrix and a modified butyl rubber in the domain, and the thermoplastic resin composition B comprises nylon 6 in the matrix and a modified butyl rubber in the domain.

16. The hose for transportation of refrigerant according to claim 15, wherein the thermoplastic resin composition A and the thermoplastic resin composition B comprise a phenylenediamine-based or a quinoline-based anti-aging agent or a trihydric alcohol having a triazine backbone, at least one processing aid, and at least one viscosity stabilizer, and 50 mass % or more of the viscosity stabilizer is contained in the matrix.

* * * * *